Figure 1:
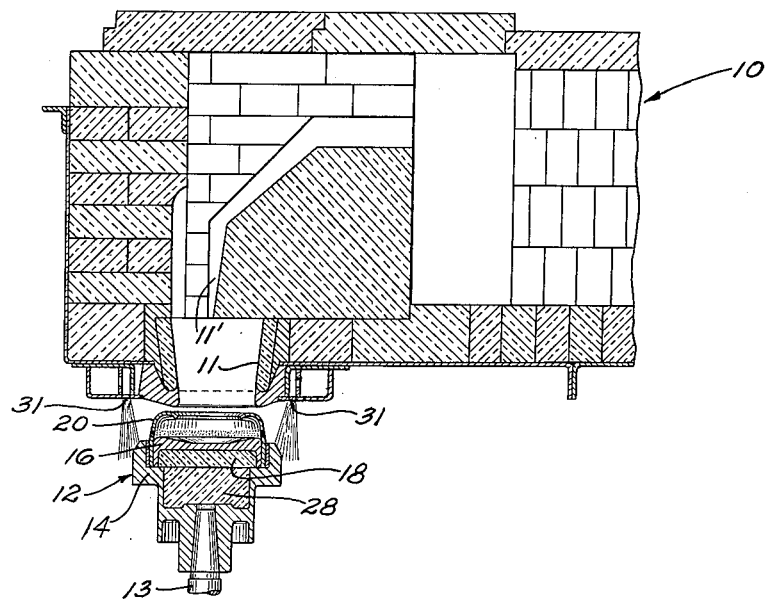

Aug. 14, 1962 M. S. FIRNHABER 3,048,885
ROTORS FOR USE IN APPARATUS FOR MANUFACTURING MINERAL WOOL
Filed March 24, 1959

INVENTOR.
Miles S. Firnhaber
BY
Morsell & Morsell
ATTORNEYS

United States Patent Office 3,048,885
Patented Aug. 14, 1962

3,048,885
**ROTORS FOR USE IN APPARATUS FOR MANU-
FACTURING MINERAL WOOL**
Miles S. Firnhaber, Pewaukee, Wis., assignor to Sealtite
Insulation Mfg. Corp., Waukesha, Wis., a corporation
of Wisconsin
Filed Mar. 24, 1959, Ser. No. 801,533
9 Claims. (Cl. 18—2.6)

This invention relates to improvements in rotors for use in apparatus for manufacturing mineral wool and the like.

The rotor comprising the present invention is designed for use in an apparatus such as that disclosed in my co-pending application Serial No. 775,203, filed November 20, 1958, now Patent No. 2,987,762, wherein molten glass or similar material is thrown from a rapidly spinning rotor by centrifugal force, the top of the rotor having radial grooves communicating with small serrations at the periphery. Heretofore, the molten glass receiving top portions of the rotors have been generally constructed of ceramic or refractory insulating material, so that the molten glass thereon is maintained at a proper temperature and viscosity. It has been found, however, that the serrations and grooves in such rotors are quickly worn off or enlarged by the erosive action of the molten material and it is necessary to replace such refractory material at frequent intervals in order to maintain a production of thin, high quality fibers.

With the above considerations in mind, the principal objects of the present invention are to provide a combination metal and refractory material rotor wherein the operating life of the rotor top is greatly increased, and wherein the fibers produced are of a consistently fine variety.

A more specific object of the invention is to provide a hollow metal rotor having a metal top portion but filled with a refractory insulating material, the metal outer surface being adapted to better withstand the erosive action of the molten material, and the refractory interior minimizing loss of heat through conduction and providing for effective control of the temperature and viscosity of the molten material.

A further specific object of the present invention is to provide a rotor assemblage employing a detachable metal rim having a multiplicity of fiber-forming apertures extending through its peripheral wall, the metallic nature of said rim minimizing the erosive effects of the molten material and increasing the life of the rotor, and the separable nature of said rim permitting its quick and easy replacement without disassembling and replacing the entire rotor.

Further objects of the present invention are to provide a rotor as above described which is relatively simple in design and construction, which is efficient in operation, and which is capable of producing an unusually high quality product.

With the above and other objects in view, the invention consists of the improved fiberizing rotor for use in manufacturing mineral wool, and all of its parts and combinations, as set forth in the claims, and all equivalents thereof.

Figure 2:
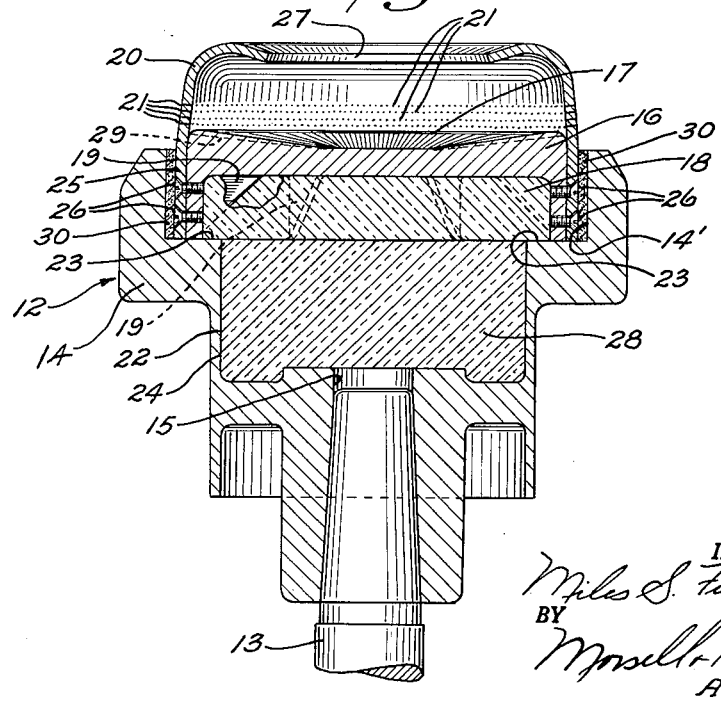

In the accompanying drawing, illustrating one complete embodiment of the preferred form of the invention, in which the same reference numerals designate the same parts in all of the views:

FIG. 1 is a vertical sectional view of the rotor assemblage comprising the present invention showing it in association with a melting furnace; and FIG. 2 is an enlarged vertical sectional view of the rotor alone.

Referring now more particularly to the drawing, the numeral 10 designates a glass melting furnace of the type described in my aforementioned co-pending application Serial No. 775,203, there being a discharge opening 11 for the molten glass which flows from the lower end of the trough 11'. The fiberizing rotor assemblage 12, comprising the present invention, is positioned beneath said discharge opening, to receive the stream of molten material on the central portion of its top, and is adapted to be rotatably driven by a shaft 13 connected to any other suitable source of power. A plurality of jets 31 are positioned above the rotor and are adapted to direct an annular series of fiberizing blasts of pre-heated air, gas or steam onto the molten material as the same leaves the periphery of the rotor.

As shown in FIG. 2, the rotor assemblage includes a cup shaped, cylindrical housing 14 formed of stainless steel or similar metal. Said housing has a tapered longitudinal opening 15 in its lower end, within which the tapered upper end of the drive shaft 13 is received and drivably engaged, and the housing has an enlarged upper end with a cylindrical, open topped well 14'. Beneath the well 14' is a central chamber 22 which is filled with refractory clay 28 or similar insulating material. Said chamber is of a smaller diameter than the well 14' so as to provide an upwardly facing, internal, circumferential shoulder 23.

Mounted within the housing well 14' is an inverted cup-like shell member 16 of high quality steel, the dished top surface 17 of said shell projecting slightly above the upper edge of the housing proper, and the shell having a depending annular wall, the lower edge of which is seated on the aforementioned internal shoulder 23. The top surface 17 of said shell is provided with radial grooves 29 which promote the formation of the mineral wool fibers. As illustrated in FIG. 2, a circumferential space is provided between the wall of said shell member and the adjacent annular housing wall, the purpose of which will be hereinafter seen.

The hollow interior of the inverted cup-like member 16 is filled with a suitable refractory material 18, said member 16 being steel and providing a hard, wear-resistant covering or shell about the body of ceramic material. It has been found that refractory clay mixed with glass or mineral wool fibers makes an unusually good insulating substance, such fibers tending to hold the clay together as well as improving its insulating qualities. To supplement the cohesive characteristics of said fibers, the shell 16 is provided with a plurality of spaced, triangular webs 19 projecting radially inwardly from its periphery to retain such insulating material in place, as well as to strengthen the shell against inward buckling.

Surrounding the shell 16, and projecting substantially thereabove, is a separable hood or rim 20 which is also formed of stainless steel, or similar hard metal. As shown in FIG. 2, said rim has a multiplicity of fiber-forming apertures 21 spaced about its circumference immediately above the top marginal portion of said member 16. In the illustrated form of the invention there are four annular rows of such apertures 21, but it is to be understood that the exact arrangement and number of apertures is not critical. The lower portion 25 of said rim is adapted to fit loosely within the circumferential space between the wall of the housing and the depending annular wall of the shell 16 and is removably secured to said wall by a plurality of bolts 26. The unit comprising the rim 20 and shell member 16 is maintained within the housing well 14' by means of refractory bonding clay 30 packed tightly within the annular space surrounding the rim portion 25. As will be readily appreciated, the entire unit may be lifted from the housing well, after the bonding clay 30 has been removed, and the rim easily separated from the shell by merely removing the screws 26.

Referring more particularly now to the cylindrical rim 20, it will be seen that the lower portion 25 of the rim wall is vertical, to fit within the aforementioned annular space, and the upper wall portion of said rim is tapered slightly inwardly, the rim diameter becoming progressively smaller near the top. The rim top surface is flanged inwardly, and slightly downwardly, and has a central opening 27.

In operation, molten material discharged from the furnace 12 is directed through the rim opening 27 onto the dished top surface 17 of the shell member 16. When the assemblage is rotated the molten material is thrown centrifugally from the periphery of said shell top and is forced through the rim apertures 21 to be acted on by the fiberizing blasts 31, the tapered nature of the upper wall portion of the rim permitting relatively even distribution of the material as between the several rows of apertures.

When the apertures 21 in said rim become eroded to such a degree that the fibers are no longer satisfactory, the rim can be quickly and easily detached and removed, as described, thus permitting replacement of the rim without replacing the entire assemblage.

The shell member 16 employed in the present invention can also be detached and replaced after the fiber-forming grooves have become worn or eroded, or after the ceramic filling 18 has become cracked by the excessive heat or otherwise damaged. At such times, the bonding clay 30 can be broken away and the member 16 withdrawn from the housing. If the rim 20 is still in good condition it may be transferred to a new shell, or if both the shell and rim are in good condition it is merely necessary to replace the refractory material 18, the separable nature of the components of the present invention premitting their independent replacement and eliminating the necessity for replacing the entire assemblage.

As will be readily appreciated from the foregoing detailed description, the present invention provides a rotor assemblage wherein the component parts are separable to permit their quick and easy replacement, wherein the outer surface of the rotor is formed of metal to withstand the erosive action of the molten material, and wherein the rotor interior is insulated with replaceable refractory material in order to minimize loss of heat and to permit effective control of the temperature and viscosity of the molten material.

It is to be understood, of course, that many variations or modifications of the novel rotor assemblage comprising the present invention will suggest themselves to those skilled in the art, and all such variations or modifications are contemplated as may come within the scope of the following claims.

What I claim is:

1. A fiberizing rotor having a main rotatably mounted support with a top cup portion having a surrounding rim, an inverted cup-shaped metal shell removably connected to the top of said support and having a top material-receiving surface and also having a deep hollow interior therebelow, there being a depending rim fitting within the rim of said support, insulating material in said hollow interior, and a metal rim removably supported by the said first two rims and projecting above said shell and having a multiplicity of apertures positioned to allow discharge of centrifugally thrown material from the top surface of said shell.

2. A rotor assemblage for producing glass fibers comprising a rotatably mounted hollow metal housing with a top well having a surrounding rim, insulating material in the lower portion of the hollow interior of said housing; an inverted cup-like metal shell having a depending rim removably mounted in the rim of said well above said insulating material and projecting above the housing, said shell having a dished top surface and a hollow interior; a relatively deep plurality of spaced webs projecting into said hollow interior; insulating material in said hollow interior; and a cylindrical metal rim removably secured between said first two rims and projecting above the shell, said last rim having a multiplicity of apertures through its periphery and having an inturned top flange, said apertures being positioned to allow discharge of centrifugally thrown material from the top surface of said shell.

3. A rotor assemblage for producing mineral fibers comprising a rotatably mounted metal housing having an outer end, an inverted cup-like metal shell having a depending rim detachably connected to the outer end of said housing for rotation therewith, said shell having a dished top surface and a relatively deep hollow interior, a plurality of spaced webs projecting into said hollow interior, insulating material in said hollow interior with said webs imbedded therein, and an annular metal rim having a portion surrounding and secured to the depending rim of the cup-like metal shell and having an annular portion projecting outwardly therefrom, said last mentioned portion having a multiplicity of apertures positioned to allow discharge of centrifugally thrown material from the top surface of said shell, and said projecting portion having an inturned annular flange surrounding an access opening.

4. A fiberizing rotor having a rotatably mounted housing with an outer end portion; an inverted cup-shaped metal shell removably mounted on said outer end portion of the housing, said shell having a material-receiving surface and having a deep hollow interior; insulating material in said deep hollow interior of said shell; and an annular rim surrounding and projecting beyond said shell, said rim having a multiplicity of apertures positioned to allow discharge of centrifugally thrown material from the top surface of said shell.

5. A fiberizing rotor having a rotatably mounted housing with an outer end portion; an inverted cup-shaped metal shell removably mounted on said outer end portion of the housing, said shell having a material-receiving surface and having a deep hollow interior; insulating material in said deep hollow interior of said shell; an annular rim surrounding and projecting beyond said shell, said rim having a multiplicity of apertures positioned to allow discharge of centrifugally thrown material from the top surface of said shell; and said rim having an inwardly flanged annular lip surrounding a central access opening.

6. A fiberizing rotor having a rotatable material-receiving member with an outer material-receiving surface on one side and having a peripheral wall, there being a rotatable support projecting from one side of said member, an annular metal rim positioned around said peripheral wall of said material-receiving member and having an annular portion projecting from said peripheral wall beyond said material-receiving surface and having an open outer molten-material-receiving end spaced a substantial distance outwardly from said material-receiving surface, which annular portion has a multiplicity of small apertures positioned to allow discharge therethrough of centrifugally thrown material from said material-receiving surface, means adjacent said peripheral wall of the material-receiving member forming a seat for removably supporting said annular rim with which the latter is engageable by movement axially of the rotor, and means for detachably securing the rim in position in said seat.

7. A fiberizing rotor having a rotatable member with an outer material-receiving surface on one side and having a peripheral wall, there being a rotatable support projecting from one side of said member, an annular metal rim positioned around said peripheral wall of said material-receiving member and having an annular portion projecting from said peripheral wall beyond said material-receiving surface, which portion has a multiplicity of small apertures positioned to allow discharge therethrough of centrifugally thrown material from said material-receiving surface, said annular projecting portion of the rim having an inwardly flanged annular lip surrounding a central molten-material-receiving opening, means adjacent the peripheral wall of the material-receiving member forming a seat for removably supporting said annular rim with which the latter is engageable by movement axially of the rotor, and means for detachably securing the rim in said seat.

8. A fiberizing rotor having a rotatably supported member with an outer material-receiving surface having a peripheral wall, an annular metal rim positioned around said peripheral wall of said material-receiving member and having an annular portion projecting from said peripheral wall beyond said material-receiving surface, which portion has a multiplicity of small apertures positioned to allow discharge therethrough of centrifugally thrown material from said material-receiving surface, said annular projecting portion of the rim having an inwardly and downwardly flanged annular lip surrounding a central molten-material-receiving opening, means adjacent the peripheral wall of the material-receiving member forming a seat for removably supporting said annular rim with which the latter is engageable by movement axially of the rotor, and means for detachably securing the rim in said seat.

9. A fiberizing rotor having a main rotatable support with an outer seat portion on one side, rotating means projecting from one side, a metal shell removably connected to said outer seat portion and having an outer material-receiving surface with a peripheral wall, a metal rim surrounding said peripheral wall of said metal shell and having an annular portion projecting from said peripheral wall beyond the material-receiving surface of said shell, said projecting portion having a multiplicity of apertures positioned to allow discharge therethrough of centrifugally thrown material from the outer surface of the shell and said projecting portion having an inturned annular lip spaced a substantial distance outwardly from the material-receiving surface of the shell, which lip surrounds a central molten material-receiving opening, and means detachably securing the annular metal rim to said outer seat portion of said main rotatable support in a position adjacent the peripheral wall of said shell.

References Cited in the file of this patent

UNITED STATES PATENTS

| | | |
|---|---|---|
| 2,192,944 | Thomas | Mar. 12, 1940 |
| 2,194,727 | Vello | Mar. 26, 1940 |
| 2,431,205 | Slayter | Nov. 18, 1947 |
| 2,616,124 | Lyle | Nov. 4, 1952 |
| 2,624,912 | Heymes et al. | Jan. 13, 1953 |
| 2,699,576 | Colbry et al. | Jan. 18, 1955 |
| 2,728,107 | Hershey | Dec. 27, 1955 |

FOREIGN PATENTS

| | | |
|---|---|---|
| 164,559 | Australia | Aug. 11, 1955 |
| 205,437 | Australia | Dec. 27, 1956 |